(12) United States Patent
Spaulding et al.

(10) Patent No.: US 9,146,659 B2
(45) Date of Patent: Sep. 29, 2015

(54) COMPUTER USER INTERFACE INCLUDING LENS-BASED NAVIGATION OF GRAPHS

(71) Applicant: Oracle International Corporation, Redwood Shores, CA (US)

(72) Inventors: Kent Spaulding, Portland, OR (US); Reza B'Far, Huntington Beach, CA (US); Ken Beckett, Foothill Ranch, CA (US); Sathyamoorthy Anandan, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 14/033,319

(22) Filed: Sep. 20, 2013

(65) Prior Publication Data

US 2015/0089422 A1   Mar. 26, 2015

(51) Int. Cl.
*G06T 11/20* (2006.01)
*G06F 3/0484* (2013.01)
(52) U.S. Cl.
CPC .................................. *G06F 3/04842* (2013.01)
(58) Field of Classification Search
None
See application file for complete search history.

(56) References Cited

U.S. PATENT DOCUMENTS

2004/0252119 A1* 12/2004 Hunleth et al. ............... 345/440
2009/0115785 A1* 5/2009 Grandhi et al. ............... 345/440

OTHER PUBLICATIONS

Anchor Modeling; obtained at http://www.anchormodeling.com/?page_id=186; Sep. 20, 2013; 20 pages.

* cited by examiner

*Primary Examiner* — Phi Hoang
*Assistant Examiner* — Mohammad H Akhavannik
(74) *Attorney, Agent, or Firm* — Trellis IP Law Group, PC

(57) ABSTRACT

In one embodiment, a movable area, referred to as a "lens," on a graph display allows the user to preview the zoom level of the graph. When a node, line or other item in the graph is in the area of the lens, then the item can be shown at a different zoom level than rest of the graph. In particular embodiments, a heuristic algorithm can be used to dynamically determine the visual representation of a node when in the lens as unique from the depiction of the node when the node is outside of the lens. Operations can be made to the graph items within the lens such as adding, moving, deleting, or connecting items, etc. Other features are described.

20 Claims, 6 Drawing Sheets

COMPUTER USER INTERFACE INCLUDING LENS-BASED NAVIGATION OF GRAPHS

CROSS REFERENCES TO RELATED APPLICATIONS

This application is related to the following application, U.S. patent application Ser. No. 14/033,327, entitled TEMPORAL GRAPH VISUALIZATION, filed on Sep. 20, 2013, which is hereby incorporated by reference, as if set forth in full in this specification.

BACKGROUND

Presentation and manipulation of data is a long-standing principal use of computing systems. Various different charts, graphs, or other approaches are used to present data to a human user. Such approaches are often referred to as "visualizations" of the data. For example, a popular visualization is a graph that includes nodes connected by lines or "edges." Such node-edge graphs can include a hierarchical tree structure where a root node is at the top, bottom, left or right of a display. Another type of node-edge graph is a circular graph where the root node may be in the middle of the display surrounded by successive children nodes in expanding concentric circles. Other variations of the node-edge graph are possible, as are many other types or varieties of visualizations.

Modern databases often require displaying and manipulating thousands or more nodes. Although the nodes and edges can be displayed in miniature, it is often not possible to include all or even a significant portion of the data in a single, comprehensible display. A user is typically provided with controls to scroll over the graph by panning and can zoom in and out of the graph to see more or less detail. This pan and zoom metaphor does not scale well as context can be lost while zooming in and out. Many solutions provide some context by displaying a small map in a separate window.

When nodes are made significantly small, it is difficult to include any associated data with the nodes, such as text or numbers, symbols, color or icon images, or other graphics or indicators. To compound the user interface issues, it is often desirable to not only display the nodes, but to also allow a user to interact with the display to scale, modify, or otherwise change the display and/or the underlying data that is represented by the display.

SUMMARY

In one embodiment, a movable area, referred to as a "lens," on a graph display allows the user to preview the zoom level of the graph. When a node, line or other item in the graph is in the area of the lens, then the item can be shown at a different zoom level than rest of the graph. In particular embodiments, a heuristic algorithm can be used to dynamically determine the visual representation of a node when in the lens as unique from the depiction of the node when the node is outside of the lens. Operations can be made to the graph items within the lens such as adding, moving, deleting, or connecting items, etc. Other features are described.

One embodiment provides a method for interacting with a graph displayed to a user, wherein the graph includes nodes and connectors, the method comprising: generating a first display of at least a portion of the graph; accepting a signal from a user input device to move a lens over the displayed graph; determining a portion of the displayed graph that is within the lens; showing an enlarged portion of the determined portion within the lens; and providing additional information associated with at least one item in the enlarged portion of the displayed graph.

A further understanding of the nature and the advantages of particular embodiments disclosed herein may be realized by reference to the specification, claims and the attached drawings.

DETAILED DESCRIPTION OF EMBODIMENTS

Figure 1:
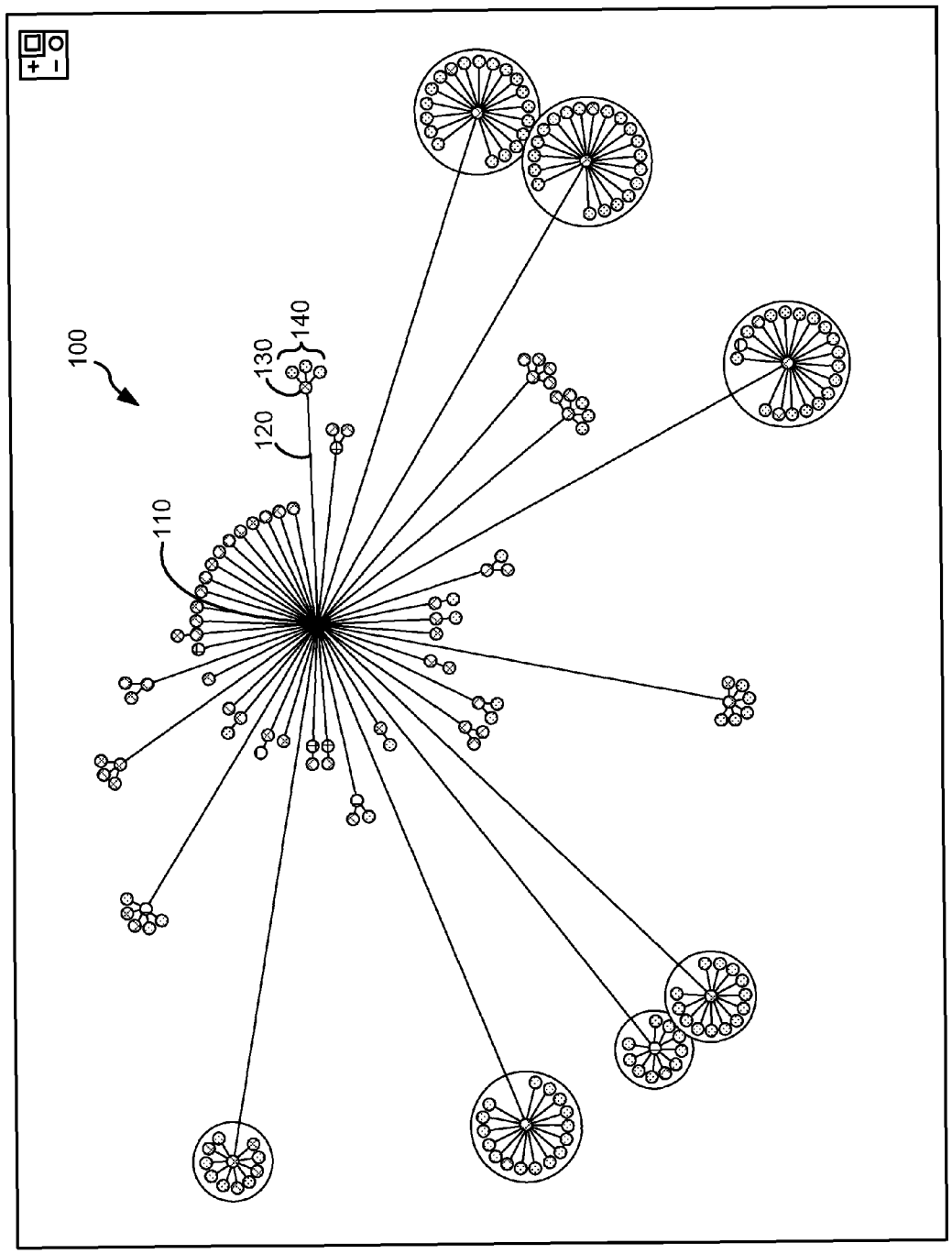
FIG. 1 shows an example of a circular graph.

FIG. 1 shows an example of a circular node-edge graph 100. This graph includes root node 110 and various other nodes that are related to the root node by connections, sometimes also referred to as "lines" or "edges," such as line 120 that joins to node 130. Node 130, has three nodes at 140 connected to it by lines. Various other nodes and connections are shown. In some circular or concentric graphs, the radial positions, or distances, of particular nodes relative to a root node or other node have meanings such as the number of child nodes of each particular node, the importance or relevance of the particular node and possibly its children, etc. Although embodiments of the invention may be described with reference to particular types of graphs, it should be apparent that features of the embodiments may be adaptable for use with any other type of graph or visualization. Any suitable data format or technique can be used to represent a graph or visualization. For example, a graph may be represented by an adjacency matrix, adjacency list, or objects comprised of nodes with links to parents and children, etc.

Figure 2:
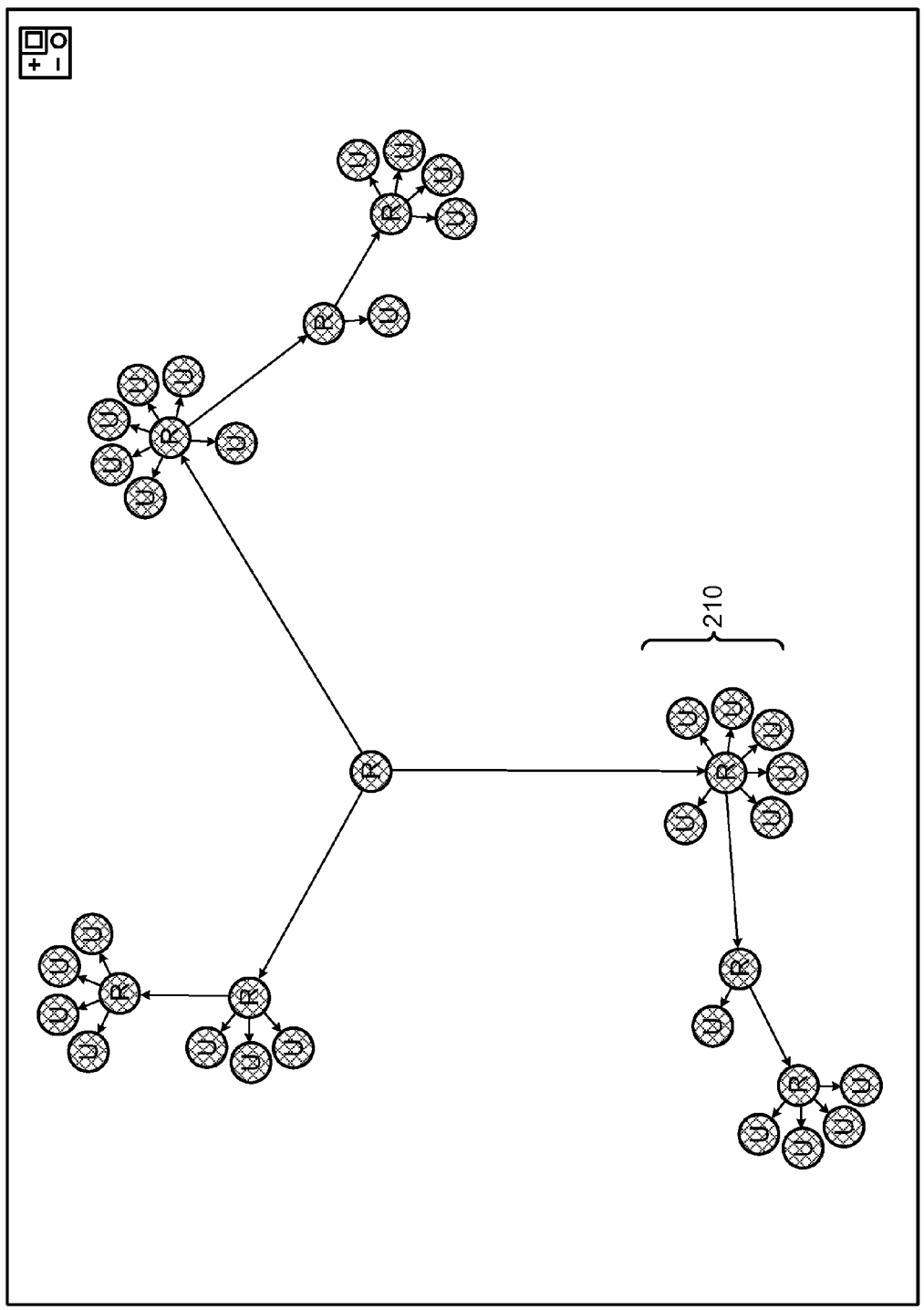
FIG. 2 shows an enlarged portion of a graph.

FIG. 2 shows an enlarged portion of a graph of the same type as shown in FIG. 1. In FIG. 2, the nodes and lines are shown larger so that more details can be included. For example, each node is now marked with a letter such as "R," "U," of "P" which, in this example, stand for "Role," "User" and "Permission," respectively. Each line now includes an arrowhead that is used to indicate dependency between two nodes, parent and child nodes, or other characteristics. Naturally, any other letters, numbers, symbols or other designations could be used.

In a particular embodiment, a user is able to change the magnification of the display according to a signal from a user input device such as with a keyboard, mouse, trackpad, touch screen, stylus, gesture, voice command, etc. In general, any type of user input device and method can be used to allow a user to change magnification (i.e., the "zoom level"), and to scroll or navigate around in the graph. As the magnification is increased (i.e., the view is "zoomed in") more or different details about the graph can be displayed because the nodes, lines and/or other items can be displayed larger since less items are being displayed in substantially the same area.

Figure 3:
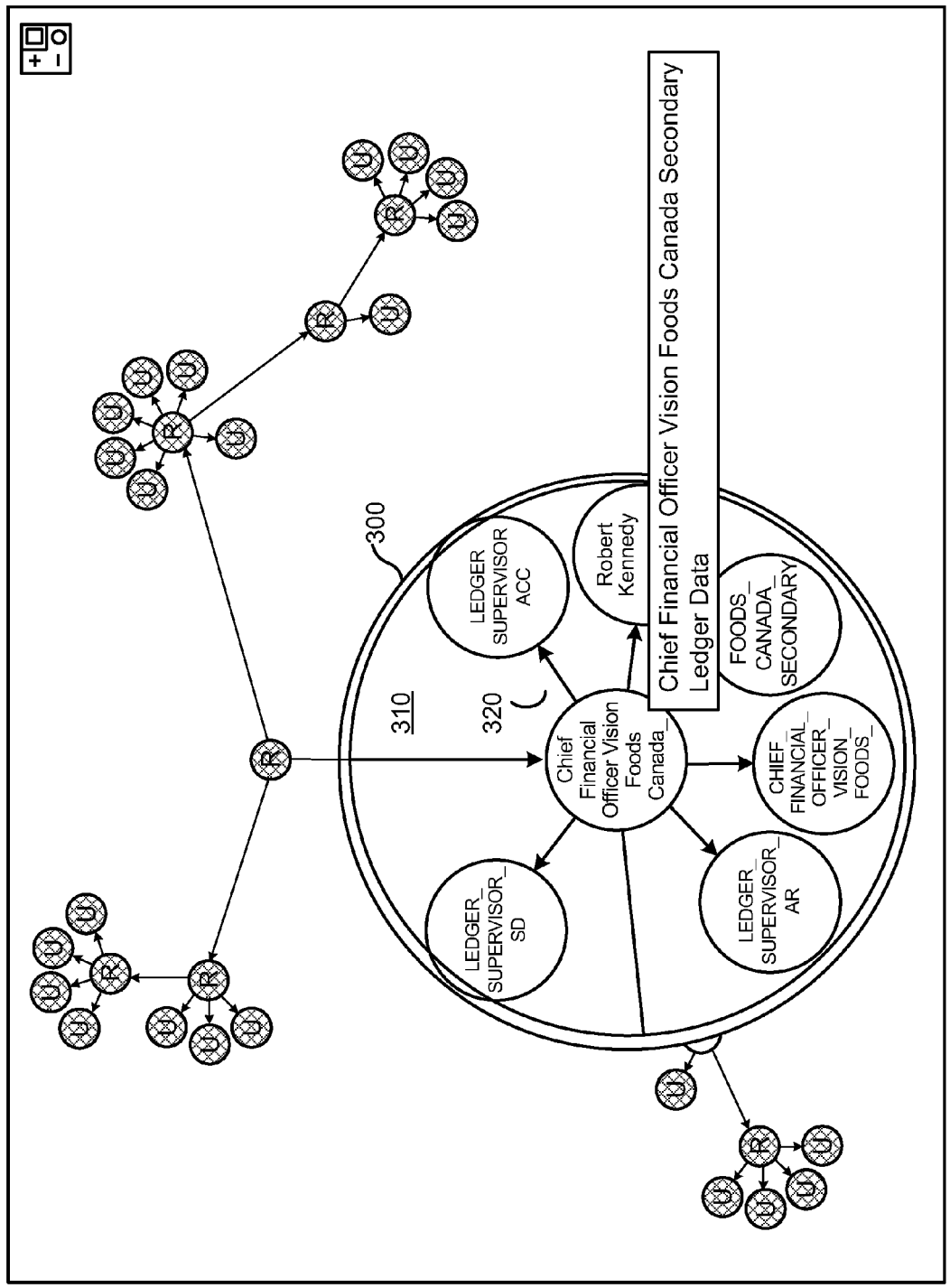
FIG. 3 shows the graph of FIG. 2 including a lens area.

FIG. 3 shows the graph of FIG. 2 with lens 300 defining a lens area 310. Graph items that are within the lens area can be magnified independently of the magnification of the greater graph or graph portion that is being displayed on a display screen or external window (also referred to as a "canvas") within which the lens is also operated. For example, the graph shown in FIG. 2 is considered the greater graph since it has smaller items but shows a larger amount of the graph. The greater graph is typically shown on a display screen or in a window of interest. The physical display screen, or window boundaries as the case may be, are the panning boundaries of the greater view. Graph portion 210 in FIG. 2 is the area that underlies lens 300 in FIG. 3 and falls within the lens area 310. Graph portion 210 is subjected to lens magnification and is cropped against the lens area boundary.

In a particular embodiment, the lens interface is used with web applications that display data. However, in other embodiments, any suitable system can be used to display data with the lens interface. For example, a standalone computer system can include all or a portion of the data and/or application. Any suitable computing system, data presentation method, data format, and/or visualization can be used. Embodiments are generally applicable to any application that uses graphs or other visualizations to represent data. This includes, among others, semantic web applications, Geographic Information Systems (GIS) applications, applications for managing cell-phone tower networks, and so forth.

Returning to FIG. 3, when the lens is used at a higher magnification than the greater graph being displayed, the graph items within the lens area are magnified and clipped against the boundary of the lens area. As shown in FIG. 3, this arrangement allows the nodes to be shown large enough that text can be rendered within each node to further describe the nodes. In this case, the name or title of documents that each node corresponds to are written into each node. Where the title is too long to fit within the node, the user can choose to view the complete title as, in this case, where the user can hover over the center node within the lens to view the entire title in a separate text box overlaying the display as "Chief Financial Officer Vision Foods Canada Secondary Ledger Data."

Another feature of the lens shows the greater graph within the lens in shadowed form at 320. In this manner, the user is able to more easily navigate among the greater graph and to get a visual cue about the part of the graph that is falling under the lens. Other mechanisms can be used to show the greater graph within the lens such as coloring, shading, animating, etc. The magnified portion of the graph within the lens will typically be shown in a more dominant way than the unmagnified portion, such as by fully rendering the magnified graph while shadowing the unmagnified graph view. However, in some embodiments this need not be the case and the opposite approach can be used or the two views can be rendered equally visible, or the greater graph view may be omitted from the lens area, altogether.

As the magnification of the graph increases, whether inside the lens or out, more details, information or other images can be provided. As the nodes become larger, more and more text information can be displayed including more titles or descriptors. One embodiment allows embedded controls to be shown and used within a node when the node is sufficiently large.

Figure 4:
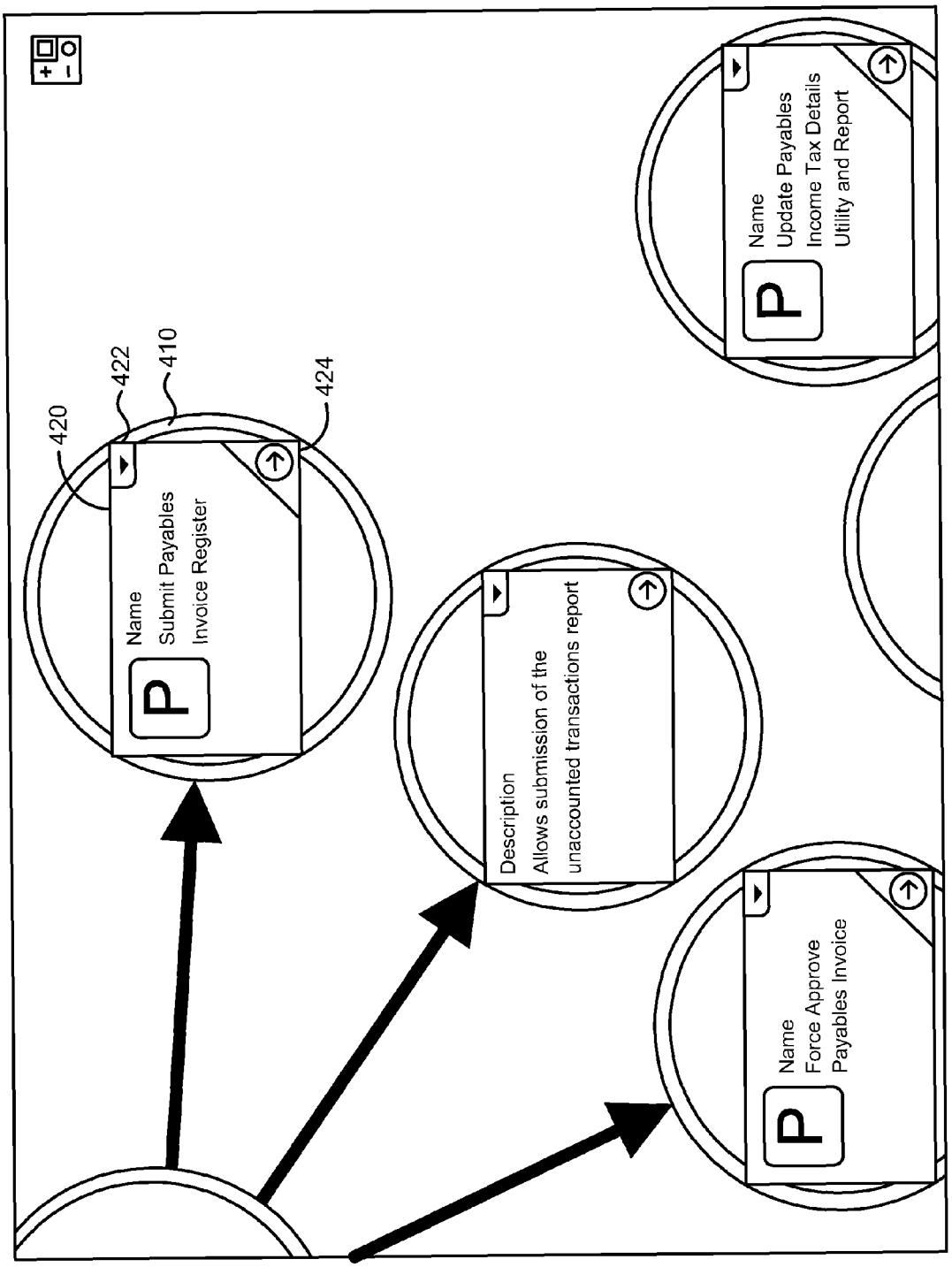
FIG. 4 illustrates large nodes that include embedded controls.

FIG. 4 illustrates large nodes that include embedded controls. In a particular embodiment a web-based visualization application users hypertext format (e.g., Hypertext Markup Language 5 (HTML 5)) which allows iFrames to include active controls that are operable within or above the node renderings. These controls can appear and be operated on nodes that are both inside or outside of the lens. In FIG. 4, node 410 includes panel 420 with actions drop-down 422 and next button 424. Since the panel is defined by HTML it can be a web page with any suitable web page controls or mechanisms associated with it such as hyperlinks, buttons, radio buttons, menus, dialog boxes, formatting, animation, etc. The panel can be a web page or browser window, itself, so that the next button displays the next page of a web site or document and the close button closes the panel or view to reveal the node view underneath.

A node at high magnification can be displayed using web controls in an iFrame that floats over the canvas at the position of the node, including inside the lens if appropriate. As magnification decreases, the iFrame size can decrease until it is time to display the node as an alternate form, e.g. as a shape rendered on the canvas itself. The software code that handles node rendering at different size, referred to as a "renderer," may change the display of the node based on magnification, data in the node, the type of the node, or any other inputs.

In various embodiments, the lens can be invoked when desired. A gesture or keystroke can display a lens, centered around a mouse pointer, that shows a magnified view (e.g., at a default initial magnification level). Nodes under the lens may change appearance, for example, morphing from a circle representing the node to a dialog box asking for input, or a table providing details about the data in the node. The lens functions by creating the appearance of a glass magnifying lens which displays a higher level of magnification of the graph as it passes over it while at the same time providing a (optional) faint image of the unmagnified graph area below it to make it easier to determine the exact location of the magnified section. The level of magnification of the lens can be increased or decreased via the mouse or keyboard. The node renderer is responsible for providing the appropriate display of a node at a given magnification level.

Heuristic based pre-fetching and caching can be used to handle the various display modes for nodes at different magnification levels to provide improved performance.

A lens and an associated node-renderer are to be displayed as if flying above this canvas while maintaining information about the location and the magnification level. The disclosure (Temporal Graph Visualization with Auto-Layout for Web Applications) discusses a likely graph visualization technique. The graph may be represented in some form, e.g. an adjacency matrix, adjacency list, or objects comprised of nodes with links to parents and children.

In a particular embodiment, one or more graph operations that are allowed to the greater graph view can also be made to items within the lens. For example, nodes can be deleted, copied, added, etc. A node or group of nodes can be selected from within the lens area and dragged outside of the lens area to, for example, connect the dragged nodes to a different node. Similarly, nodes can be dragged into the lens area for connecting to a node within the lens.

Figure 5:
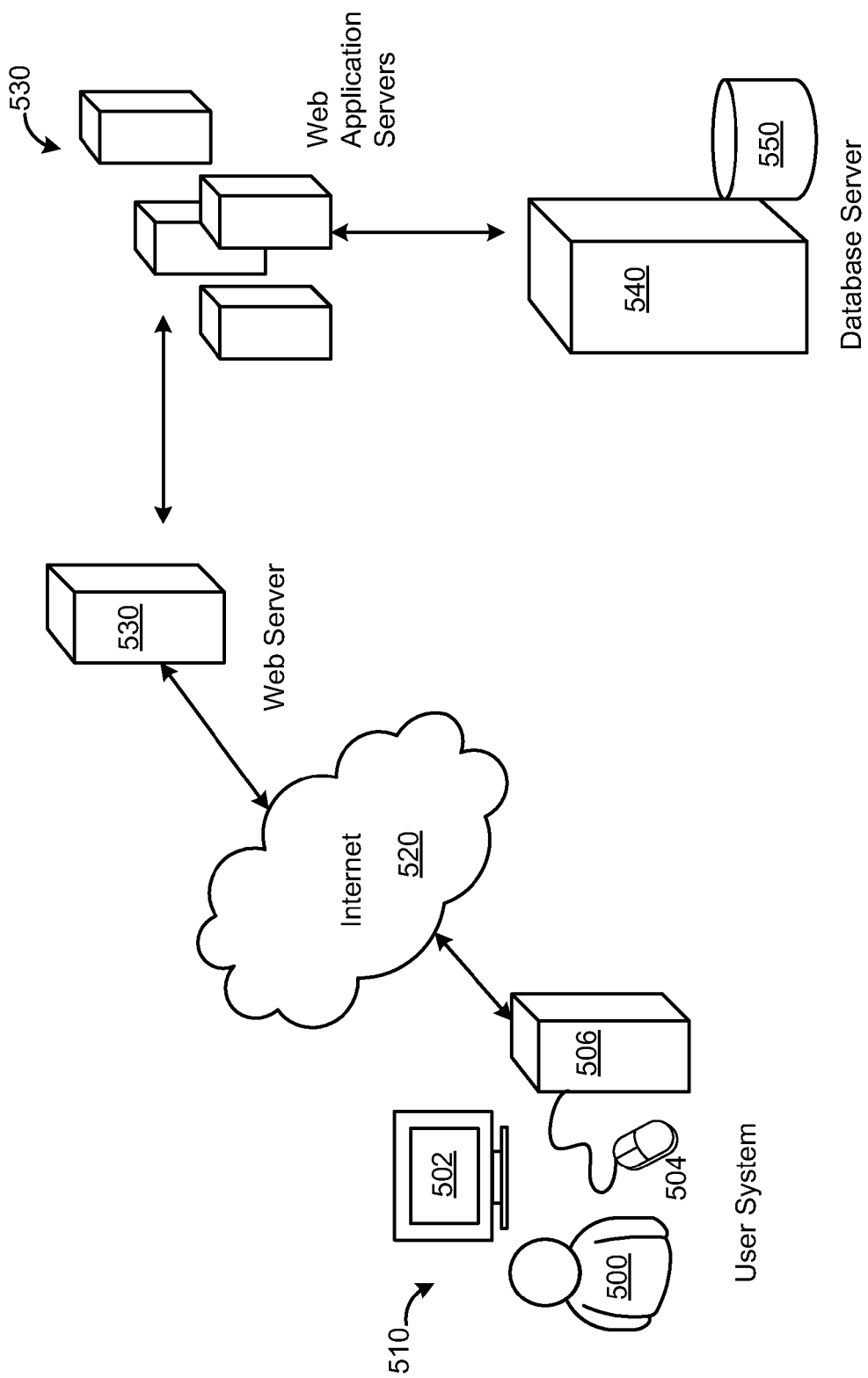
FIG. 5 provides a basic diagram of hardware that can be used to implement various features described herein.

FIG. 5 provides a basic diagram of hardware that can be used to implement various features described herein. The diagram of FIG. 5 is symbolic and merely representative of the types of high-level hardware, software, subsystems or components that might be used. The operation of the various components is well-known so only a basic description is provided herein.

In a particular embodiment, a graph display or other data visualization is provided as a web application. In general, web applications run largely on a computer system that is geographically remote from an end user. The end user's system executes a web browser which receives web page data for display and transmits control commands that are invoked by the user on the web page. In web applications, graphs can have tens of thousands, millions or more data items that are part of a visualization. The need to efficiently handle these large graphs via a web browser interface where web page requests and transfers of large amounts of data are desired to be kept low presents design and engineering challenges that are addressed by some of the features described herein.

Web applications require only a web browser on the client side, enabling the users to access the application from almost any computer. Some web applications require the use of a specific web browser and most require browser add-ins and browser languages such as JAVA. Data can be shared with many users in an organization regardless of location. Response time of a web application is dependent on the connection speed (For Internet: dial-up, DSL, Fiber Optics, etc.).

In FIG. 5, user system 510 is operated by user 500 and can include display screen 502, user input device 504 and computer system 506. Computer system 506 houses familiar subsystems such as a processor, memory, hard disk drive, solid state drive, network interface, graphics card, etc. The computer system and associated components can be in many different shapes, sizes and configurations. For example, a laptop or all-in-one computer system can have the display, user input devices and computer system and subsystems all in one enclosure. Other arrangements are possible.

In a web application, user 500 accesses a software program over Internet 520. Signals generated by a user input device can be responded to by user computer 506 in whole or in part and can also be communicated to the Internet or other network. Such communication can be by wireless, wired, optical fiber, etc. In general, many variations are possible from the discussion of the specific example provided here in association with FIG. 5.

Web server 530 receives signals from user system 502 and manages various requests and information in exchanges with the user system. Some of the requests require the web server to communicate with one or more web application servers 530. Web application servers 530 may access database server 540 which, in turn, may access database 550. For example, web application software may execute for the most part on web application servers 530. The web application software can respond to a user-generated request to zoom in, or magnify, a portion of a graph being displayed on the user's display screen 502. In an embodiment, the lens magnification rendering is dynamic and performed on the client system, with additional data streaming from the server as required. Other embodiments may perform all or a portion of the lens magnification operations and rendering on the server or on other systems.

To properly generate the display and provide more details for the enlarged nodes, web application software may send a command to fetch information from database server 540 which may obtain data from external database 550. Web application software executing on web application servers 530 may render the updated display in a browser-compatible format such as an HTML 5 web page and provide the page information to web server 530 which sends the page information to the user's computer via Internet 520. The user computer system 506 executes a web browser which interprets the web page information and renders a display of the magnified graph.

Note that other embodiments may have different parts of the system performing different tasks. For example, the web page information may be generated by web server 530 and then transferred to the user computer system for display by a web browser. Or in non-web based applications the graph data, itself, may be sent in whole or in part to a program executing on user system 506. Many variations are possible. In general, any one or more processors in the system may perform all or part of a task, as desired, and depending upon the overall system implementation.

Components may be added to, removed or modified from those shown in FIG. 5. For example, in other embodiments the web server function may be performed by a web application server. Depending on how data is stored or needed, a database server system may not be required. Other variations are possible.

Figure 6:
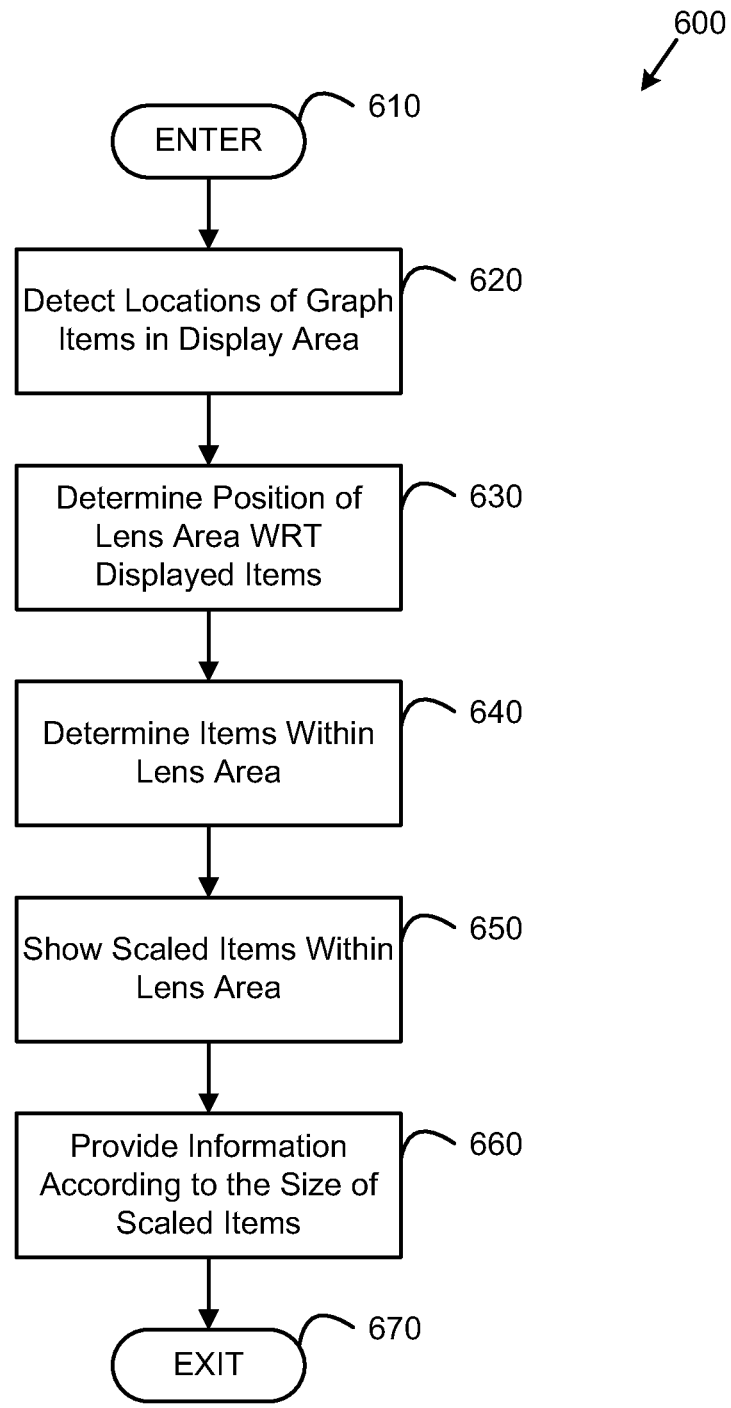
FIG. 6 is a flowchart that illustrates basic steps in a procedure to implement a lens display according to an embodiment.

FIG. 6 shows a flowchart that illustrates basic steps in a method to implement a lens display according to an embodiment. In FIG. 6, flowchart 600 is entered at step 610 when it is desired to generate or update a display of a lens.

Step 620 is executed to detect the location of graph items such as nodes and connectors, and any other objects or images that may appear in or in association with a graph. Next, step 630 is executed to determine the position of the lens with respect to any graph items or other objects that may be displayed. Typically, the graph is displayed in a window in an operating system, in a browser or in a different defined area of one or more display screens. Since the user will be moving the lens, the procedure of flowchart 600 would typically be called each time there is a change in the displayed objects and/or there is a change in the lens position, magnification, or other properties.

Step 640 is executed to determine the portion of the graph or other objects that can be subjected to lens scaling (e.g., magnification). At step 650, the scaled items and/or objects that are determined to be within the lens area once scaled are displayed within the lens area. Note that although the lens will typically be used to magnify objects, it is also possible to use the lens at a lower magnification than the greater graph so that the objects are seen smaller in the lens area. In a particular embodiment, any parts of the graph that are also within the lens are also shown in subdued form at the greater graph magnification. For example, the graph nodes and edges can be shown in grayed out, shaded or shadowed form. This can provide additional cues to the user of the lens viewing location in the greater graph display.

At step 660 additional or different information may be displayed within the lens area dependent upon the size of an object within the lens area. For example, as nodes are shown at larger magnification, more text may be shown within the node, more details about node characteristics can be shown, active controls can be shown, etc., as described herein. The routine of flowchart 600 exits at 670.

It should be apparent that flowchart 600 is merely a basic example to show broad acts that can be performed to implement some of the functionality described herein. In different embodiments, steps may be added to, removed from, or modified from those shown in FIG. 6. The acts or steps may be performed by any one or more processors that can be in the same or different geographical locations and acting at different times, as desired. Any suitable programming techniques and/or computing architectures may be used.

Although the description has been described with respect to particular embodiments thereof, these particular embodiments are merely illustrative, and not restrictive. For example, the lens can be any suitable shape and size. The lens shape and dimensions can be chosen by a user, varied automatically by a computer system, provided as default or predetermined settings, etc. The lens size can be made larger or smaller, as desired as, for example, by allowing a user to input a signal via a mouse wheel, gesture, voice command, swipe, pinch or other action. Multiple lenses and/or display screens or windows can be used. Although the lens has been described as presenting an enlarged view from the greater graph display, other embodiments may provide a scaled down view in the lens (i.e., the image in the lens area is at a smaller scale or lesser magnification than the greater graph view). Or additional details or information about the graph items may be provided within the lens area that are separate from scaling the graph items. Other variations are possible.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for viewing a node-edge graph displayed to a user, wherein the node-edge graph includes nodes, the method comprising:
generating a first display of at least a portion of the node-edge graph;
accepting a first signal from a user input device to move a lens area over the displayed node-edge graph;
determining a portion of the displayed node-edge graph that is within the lens, wherein the portion of the displayed node-edge graph that is within the lens includes at least one node;
showing a scaled portion of the determined portion within the lens, wherein the scaled portion includes at least a portion of a scaled node; and
providing information associated with the scaled node, according to a size of the scaled node, in the scaled portion of the displayed node-edge graph.

2. The method of claim 1, further comprising:
accepting a second signal from a user input device to allow a user to move the lens area about on the node-edge graph.

3. The method of claim 1, further comprising:
accepting a second signal from a user input device to change a magnification of a node within the lens area.

4. The method of claim 3, further comprising:
changing a additional information in response to the change in magnification.

5. The method of claim 4, further comprising:
increasing an amount of text displayed in association with a node when the node is magnified within the lens area.

6. The method of claim 1, further comprising:
accepting a second signal from a user input device to make a change to the node-edge graph within the lens area.

7. The method of claim 1, further comprising:
accepting a second signal from a user input device to drag one or more nodes from inside the lens area to outside the lens area.

8. An apparatus comprising:
one or more processors;
one or more processor-readable non-transitory tangible media including instructions executable by the one or more processors for:
generating a first display of at least a portion of a node-edge graph;
accepting a first signal from a user input device to move a lens area over the displayed node-edge graph;
determining a portion of the displayed node-edge graph that is within the lens, wherein the portion of the displayed node-edge graph that is within the lens includes at least one node;
showing a scaled portion of the determined portion within the lens, wherein the scaled portion includes at least a portion of a scaled node; and
providing information associated with the scaled node, according to a size of the scaled node, in the scaled portion of the displayed node-edge graph.

9. The apparatus of claim 8, further comprising:
accepting a second signal from a user input device to allow a user to move the lens area about on the node-edge graph.

10. The apparatus of claim 8, further comprising:
accepting a second signal from a user input device to change a magnification of a node within the lens area.

11. The apparatus of claim 10, further comprising:
changing a additional information in response to the change in magnification of the node within the lens area.

12. The apparatus of claim 11, further comprising:
increasing an amount of text displayed in association with a node when the node is magnified within the lens area.

13. The apparatus of claim 8, further comprising:
accepting a second signal from a user input device to make a change to the node-edge graph within the lens area.

14. The apparatus of claim 8, further comprising:
  accepting a second signal from a user input device to drag one or more nodes from inside the lens area to outside the lens area.

15. A processor-readable non-transitory tangible media including one or more instructions executable by one or more processors for:
  generating a first display of at least a portion of a node-edge graph;
  accepting a first signal from a user input device to move a lens area over the displayed node-edge graph;
  determining a portion of the displayed node-edge graph that is within the lens, wherein the portion of the displayed node-edge graph that is within the lens includes at least one node;
  showing a scaled portion of the determined portion within the lens, wherein the scaled portion includes at least a portion of a scaled node; and
  providing information associated with the scaled node, according to a of the scaled node, in the scaled portion of the displayed node-edge graph.

16. The processor-readable non-transitory tangible media of claim 15, further comprising:
  accepting a second signal from a user input device to allow a user to move the lens area about on the node-edge graph.

17. The processor-readable non-transitory tangible media of claim 15, further comprising:
  accepting a second signal from a user input device to change a magnification of a node within the lens area.

18. The processor-readable non-transitory tangible media of claim 17, further comprising:
  changing a additional information in response to the change in magnification of the node within the lens area.

19. The processor-readable non-transitory tangible media of claim 18, further comprising:
  increasing an amount of text displayed in association with a node when the node is magnified within the lens area.

20. The processor-readable non-transitory tangible media of claim 15, further comprising:
  accepting a second signal from a user input device to make a change to the node-edge graph within the lens area.

* * * * *